United States Patent [19]

Wong et al.

[11] Patent Number: 4,613,977
[45] Date of Patent: Sep. 23, 1986

[54] DIGITAL NAVSTAR RECEIVER

[75] Inventors: Andrew C. C. Wong, Harlow; Graham R. Fearnhead, Writtle Chelmsford; Simon J. Gale, Bishops Stortford, all of United Kingdom

[73] Assignee: Standard Telephones and Cables Public Limited Company, London, England

[21] Appl. No.: 676,420

[22] Filed: Nov. 29, 1984

[30] Foreign Application Priority Data

Jan. 19, 1984 [GB] United Kingdom ............... 8401431

[51] Int. Cl.⁴ .................... H04B 1/30; H04L 7/04
[52] U.S. Cl. ...................... 375/97; 343/420; 375/115; 375/118
[58] Field of Search ............ 375/115, 118, 97, 99, 375/119; 343/358, 418, 420

[56] References Cited

U.S. PATENT DOCUMENTS

| 4,320,526 | 3/1982 | Gitlin ............................ 375/118 |
| 4,509,017 | 4/1985 | Andren et al. .................. 375/97 |
| 4,527,278 | 7/1985 | Deconche et al. ............... 375/97 |
| 4,530,103 | 7/1985 | Mosley, Jr. et al. ............ 375/115 |

OTHER PUBLICATIONS

B. D. Elrod, H. A. Bustamante and F. D. Natali, "A GPS Receiver Design for General Aviation and Navigation", *IEEE Plans 80: Position Location and Navigation Symposium*, Atlantic City, N.J., U.S.A., Dec. 8-11, 1980, pp. 33-41.

P. Ward, "An Advanced Navstar GPS Multiplex Receiver", *IEEE Plans 80*: Dec. 8-22, 1980, pp. 51-58.

Peter C. Ould and Robert J. VanWechel, "All-Digitial GPS Receiver Mechanization", *Navigation: Journal of the Institute of The Institute of Navigation*, vol. 28, No. 3, Fall 1981, pp. 178-188.

G. L. Bjornsen and W. M. Hutchinson, "GDM/GPS Receiver Hardware Implementation", *NAECON '77 Record*, pp. 303-309.

*Primary Examiner*—Marc E. Bookbinder
*Attorney, Agent, or Firm*—Kerkam, Stowell, Kondracki & Clarke

[57] ABSTRACT

A receiver for a Navstar satellite navigation system wherein the satellite signals are down converted into zero i.f. quadrature signals (70a, 70b) and digitized (71a, 71b). The digitized signals address a PROM (72) together with additional bits representing phase rotation information (74) and locally generated code signals (e,l,p). The PROM is loaded with data in the form of "look-up" tables incorporating combinations of all input signal conditions whereby the combined address signals effect correlation and phase rotation simultaneously of the received signals.

5 Claims, 7 Drawing Figures

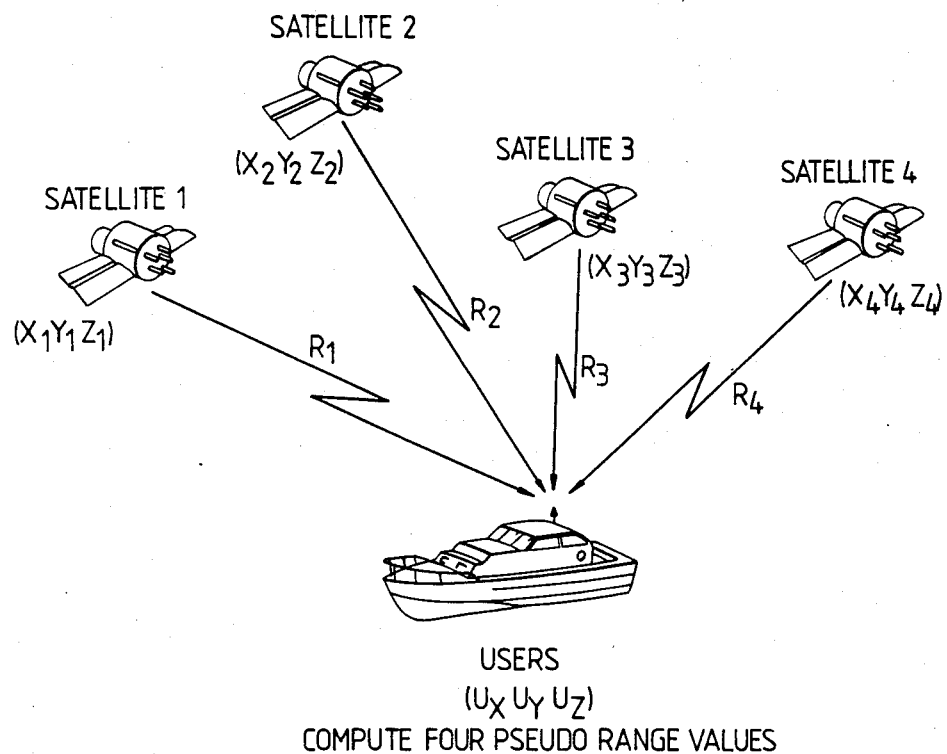
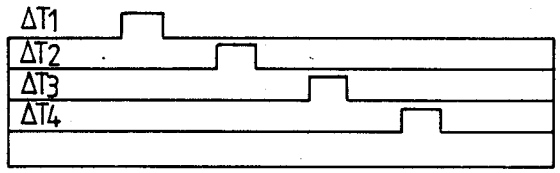
Fig. 1.
PRIOR ART $(X_1 - U_X)^2 + (Y_1 - U_Y)^2 + (Z_1 - U_Z)^2 = (R_1 - C_B)^2$
$(X_2 - U_X)^2 + (Y_2 - U_Y)^2 + (Z_2 - U_Z)^2 = (R_2 - C_B)^2$
$(X_3 - U_X)^2 + (Y_3 - U_Y)^2 + (Z_3 - U_Z)^2 = (R_3 - C_B)^2$
$(X_4 - U_X)^2 + (Y_4 - U_Y)^2 + (Z_4 - U_Z)^2 = (R_4 - C_B)^2$

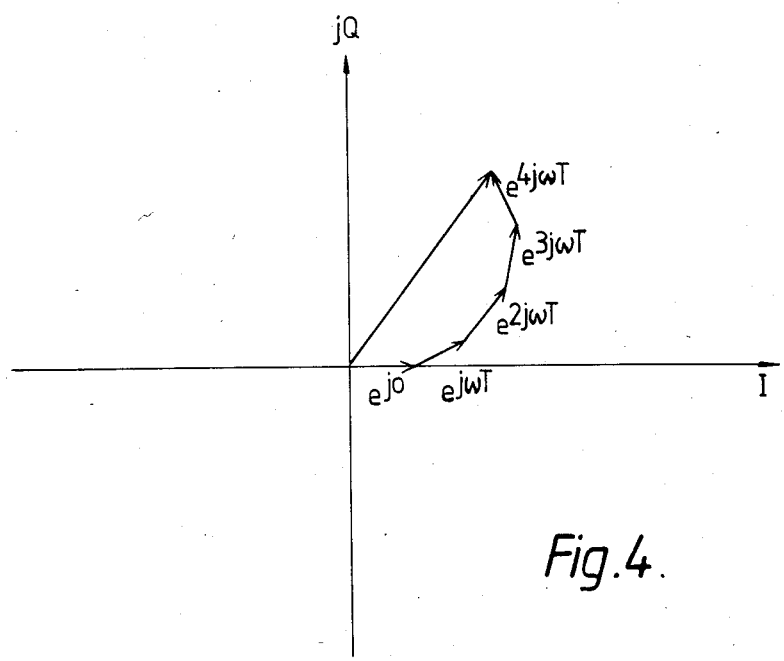
*Fig.4.*
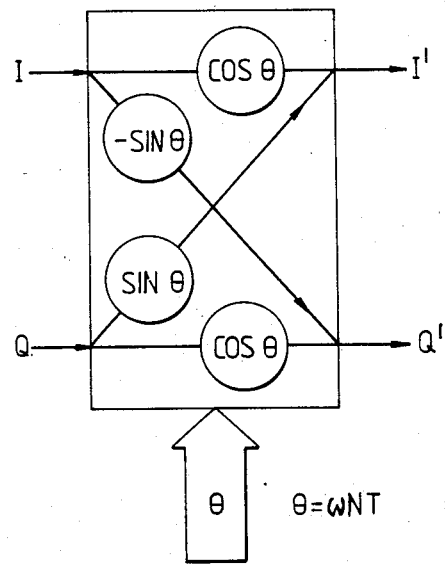
$\theta = \omega NT$  *Fig.5.*

DIGITAL NAVSTAR RECEIVER

BACKGROUND OF THE INVENTION

This invention relates to receivers for the Navstar satellite navigation system.

Navstar is a satellite navigation system which is planned to give continuous worldwide all-weather coverage, providing highly accurate, three-dimensional position and velocity information.

The complete Navstar system is planned to consist of 18 satellites arranged in nearly circular orbits with radii of 26,600 km, and an inclination to the earth's equatorial plane of 55 degrees. Each satellite transmits two navigation signals, designated L1 and L2 and centered at 1575 and 1228 MHz respectively.

Both signals convey ranging information by means of modulations which are locked in time to atomic standards. The forms of these modulations (which are known as pseudorandom codes because they appear random, but are nevertheless well defined) are unique to each satellite.

By measuring the phases of the received codes against a clock in the receiver, together with the Doppler shifts of the radio frequency carriers, a user can calculate the range and range rate to a particular satellite by monitoring four satellites (FIG. 1). By decoding data about their motions which are also modulated on to the transmitted signals, the user may solve equations (FIG. 2) to determine his three-dimensional position and velocity and also apply corrections to his clock, making it conform to satellite time.

Alternatively, if he is constrained to move on the surface of the earth or is at known altitude, he may make two-dimensional measurements using three satellites. The software controlling the receiver must choose from the satellites in view the subset which gives the most favourable geometry for the navigational calculations.

Two pseudorandom codes are in fact transmitted by each satellite. The first of these is used to aid acquisition of the satellite signals and to provide coarse navigation, and hence is called the Coarse/Acquisition (C/A) code. The second has a 10-times higher modulation rate which yields the full navigational accuracy of the system, and is designated the Precision (P) code.

A basic Navstar receiver typically contains a low-noise amplifier and down-converter to a convenient IF, followed by one or more code and carrier tracking channels, each capable of tracking the transmissions from any satellite. There is also associated range and range-rate measurement circuits.

The purpose of the code tracking loop is to keep a code generator in the receiver in step with a received pseudorandom sequence, and hence provide information on the range to the satellite being tracked.

To obtain a position and velocity estimation, a receiver must be locked to the transmissions from a number of satellites. Consider the case of a complete three-dimensional estimation for which the required number is four, as depicted in FIG. 1. Four measurements of "pseudo-range" are made by locking code tracking loops to the received signals and then timing the occurrence of certain states of the code generators within the loops with the aid of the receiver's clock. The measurements are of "pseudo-range" rather than true range because of the (as yet) undetermined receiver clock offset.

Similarly, by measuring the frequencies of the carrier tracking loop voltage-controlled oscillators over gating times determined by the receiver clock, four measurements of "pseudo-range rate" are obtained. These are in error from the true range rates because of the clock's frequency error. All these measurements, together with data from each satellite which provides information about satellite motion, then enable a navigational solution to be obtained. This relies on the fact that four observations are required to solve for four unknowns.

SUMMARY OF THE INVENTION

A receiver for a Navstar satellite navigation system including amplification and down conversion to i.f. frequencies to produce quadrature signals, analogue-to-digital converters to digitise separately the quadrature signals, local digital code generating means, means for correlating the digitised quadrature signals separately with the same locally generated digital codes, channel signal processing means to which the outputs of the correlation means are applied, the processing means being arranged to control the code and carrier tracking of the receiver, and correction means responsive to control signals generated in the processing means to effect phase rotation of the baseband signal phasor represented by the quadrature signals to effect Doppler tracking in the receiver loop. The receiver includes a digital data memory means loaded with data in the form of "look-up" tables incorporating combinations of signal input conditions, means for applying the digitised quadrature signals as partial address signals for the memory means, and means for generating additional address signals for the memory means in response to the control signals whereby phase rotation correction is effected by accessing the memory means in accordance with the address signals to produce an output signal for the channel signal processing means.

FIG. 3 shows a generalised Navstar receiver architecture. Signal is taken in at L-band and passed through successive stages of amplification and down-conversion at r.f., i.f. and zero i.f. frequencies. At some point in the chain, the signal will have to go through an analogue to digital interface, to allow information extraction by a digital processor. If the code and carrier loops are closed in software, this processor would also provide the necessary feedback control signals.

There are a number of possible positions at which code and carrier (Doppler) injection can take place: at i.f. baseband analogue, or baseband digital. Beyond the injection point in the receiver chain, the circuit becomes dedicated to the reception of signals from a particular satellite. Hence, for reception of transmissions from several satellites, the circuitry after this point has to be duplicated by the number of satellites intended, or alternatively, be time-shared (cycled or multiplexed) between the same number. Therefore, in order to reduce circuit complexity, the injection point should be pushed as far back in the chain as possible. The furthest point that this process can be effected is by performing both code correlation and Doppler correction at digital baseband.

Other considerations can also be put forward to favour a baseband solution. By performing code correlation at baseband, true multipliers can be used instead of mixers, thus avoiding the problem of mixer leakages. The stability and Q-factor of the filters required to define the pre-correlation bandwidth would demand quite stringent specifications at i.f. The problem is considerably eased by performing low-pass filtering at baseband. Also, the need to use multiple transfer loops in the synthesiser to implement i.f. Doppler injection can be avoided.

BRIEF DESCRIPTION OF THE DRAWINGS

FIG. 1 (previously referred to) illustrates the Navstar satellite navigation system;

FIG. 4 illustrates the effect of Doppler shift;

FIG. 5 illustrates phase rotation;

DESCRIPTION OF PREFERRED EMBODIMENTS

The possibility of providing digital Doppler correction at baseband is highly desirable as this will permit the use of a single fixed frequency down-conversion to zero i.f. followed by a single pair of A/D converters, irrespective of the number of receiver channels required.

In order to represent the signal phasor at baseband, In-phase (I) and Quadrature (Q) channels are necessary with the I and Q channels denoting the real and imaginary components of the phasor. Any Doppler shift will cause the phasor to rotate and so produce a Doppler loss if filtering is implemented by accumulation of successive phasor samples. This effect is shown in FIG. 4. The rotation must therefore be removed or considerably reduced before appreciable accumulation may take place.

The signal vector may be expressed in exponential form thus:

$$\hat{S} = Ae^{j(\omega NT + \phi)} \quad N = 0,1,2 \ldots$$

where A is the signal amplitude, $\omega$ is the Doppler frequency, T the sample interval, and $\phi$ is an arbitrary angle.

In order to remove the phase rotation, the signal vector must be multiplied by a counter-rotating unit vector thus:

$$\hat{S}' = Ae^{j(\omega NT + \phi)} \cdot e^{-j\omega NT} = Ae^{j\phi}$$

The phasor will now appear to be stationary and may be accumulated in time without loss.

The practical implementation of the counter-rotation function on the I and Q channels may be easily appreciated by expressing the multiplication in real and imaginary parts thus:

$$(I + jQ)(\cos \omega NT - j \sin \omega NT) =$$

$$\underbrace{I \cos \omega NT + Q \sin \omega NT}_{I'} + \underbrace{jQ \cos \omega NT - jI \sin \omega NT}_{Q'}$$

The transformation is shown diagrammatically in FIG. 5.

Figures 2, 3:
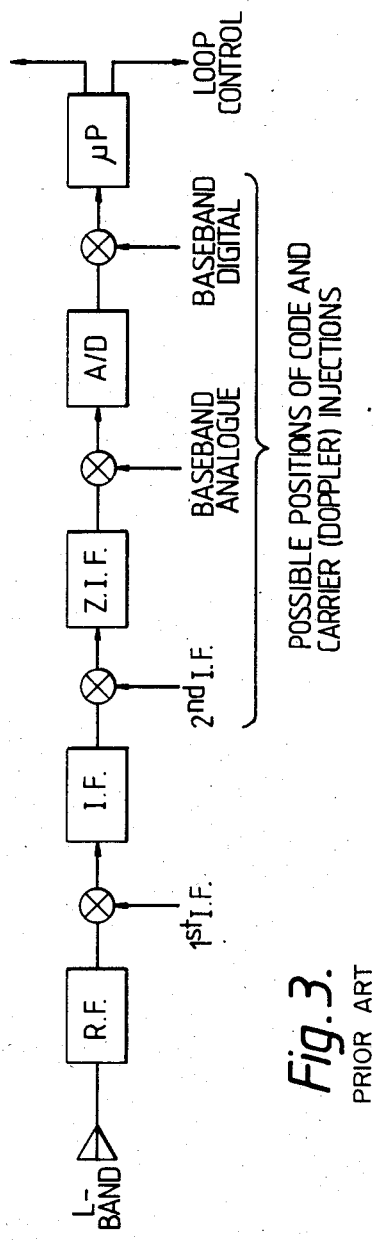
FIG. 2 (previously referred to) illustrates the equations to be solved by a user of the Navstar system.
FIG. 3 (previously referred to) illustrates a generalised Navstar receiver architecture.
Figure 6:
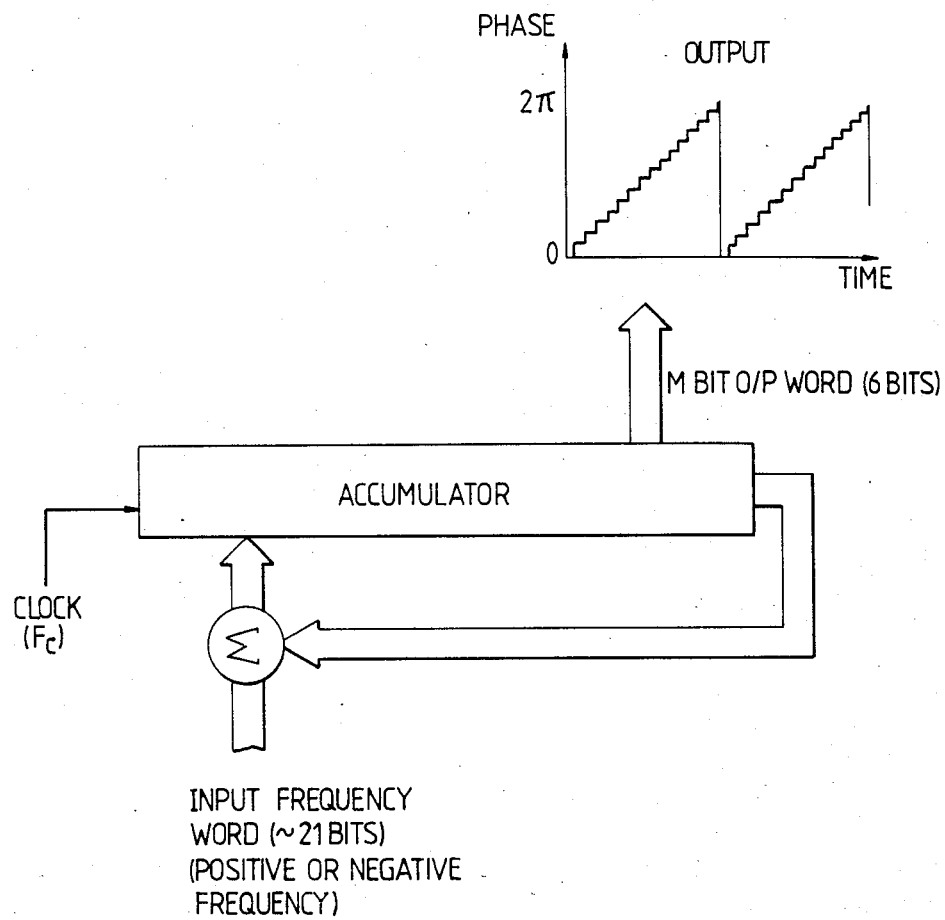
FIG. 6 illustrates a numerically controlled oscillator.
Figure 7:
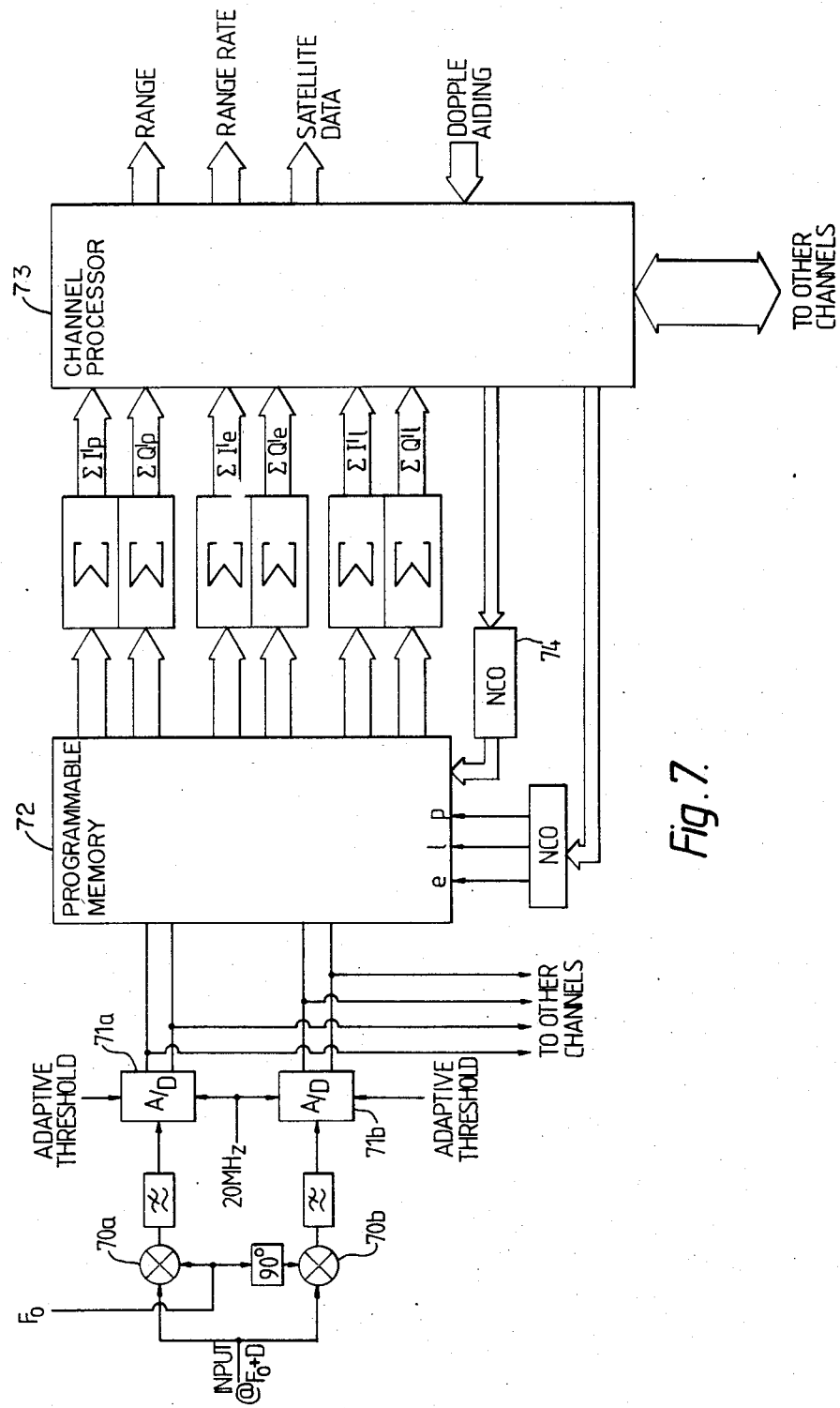
FIG. 7 depicts a channel in a Navstar receiver.

The rotation angle, $\omega NT$ may conveniently be provided by a Numerically Controlled Oscillator (NCO) of the form shown in FIG. 7. The angle will then be represented by an M bit digital word. The word length required will be determined by the maximum phase noise that may be tolerated from the rotation operation. The resultant phase noise will be given by evaluation of the rms quantisation noise. If 6 bits are used a phase quantisation of 0.098 radians will result with an associated rms phase noise, $\sigma_{100}$, of:

$$\sigma_\phi^2 = \frac{0.098^2}{12}$$

giving $\sigma_{100} = 0.028$ rad. rms.

This value will typically be well below the thermal noise expected in Navstar phase tracking loops.

The frequency range and resolution of the NCO must be adequate to cover the complete expected Doppler range in steps small enough to prevent significant phase errors accumulating between NCO updates. A Doppler range of $\pm 10$ kHz will be more than adequate as this will encompass the full satellite Doppler range of $\pm 4$ kHz together with a user velocity range of $\pm$Mach 3.8. In considering the frequency resolution of the device it may be assumed that the NCO will be updated at an effective rate of approximately twice the loop bandwidth. Thus for a narrow bandwidth case with an update rate of about 1 Hz a frequency resolution of 0.01 Hz will permit a worst case phase error of $\approx 0.06$ radians to accrue. This is consistent with the phase noise given above. The number of bits required to control the NCO is therefore defined as:

$$\log_2 (20.10^3/0.01) \approx 21 \text{ bits.}$$

The NCO must also be clocked at a sufficiently high rate to prevent jitter on the phase ramp output occurring. This jitter is produced as a consequence of the oscillator only producing a finite number of output samples per output cycle. The problem is therefore worst at the highest output frequency. In order to reduce this effect to the level of the phase quantisation, therefore, approximately 64 output samples per output cycle will be required. This corresponds to a clocking rate of 640 kHz.

Positioning of the phase rotator after some accumulation of the correlator output is acceptable provided that no appreciable Doppler loss occurs during that accumulation time. The loss may be easily evaluated by examining the accumulator frequency response, $F(\omega)$, thus:

$$F(\omega) = \left| \frac{1}{N} \sum_{i=1}^{N} e^{ij\omega T} \right| = \frac{\sin \frac{N\omega T}{2}}{N \sin \frac{\omega T}{2}}$$

For a maximum 1 dB loss therefore, at the maximum Doppler frequency of 10 kHz, N may be no greater than 547. Putting the phase rotator after this amount of accumulation would result in the throughput rate of the device being reduced from 20 MHz to approximately 40 kHz. Further accumulation may then be used to reduce the output data rate to a sufficiently low value for handling by a microprocessor. This would be in the order of 1 kHz. There is however one further aspect of the configuration to be examined, that is, the required I and Q word-lengths.

The number of bits required for the I and Q digitisations will be application dependent. If a 2 dB loss can be tolerated then single bit conversion will be adequate. However if 2 bits are used this loss will be reduced to 0.6 dB. These two cases assume that the signal to noise ratio is negative. As progression is made through the accumulation stages this will not always be the case and more bits will become necessary.

The point at which phase rotation is effected therefore will depend on the implementation of the device. A 2 bit rotator operating at 20 MHz may be placed directly before or after the correlator. Alternatively a slower but greater word length rotator may be used after a limited amount of post correlation accumulation.

In considering the 2 bit 20 MHz solution it can be seen that a simple implementation could be achieved by using a PROM look-up table. The addresses would consist of 4 bits of I and Q signal data together with the 6 bits necessary to define the phase rotation. The outputs would be simply 4 bits of rotated I and Q information. The PROM size would therefore be 4 k configured as a 1 k×4. If single bit digitisation was adequate then this could be reduced to 256×2.

This concept may be taken one stage further by combining the single bit correlation function in the rotation PROM. Finally the prompt correlation together with switched or dedicated early/late correlation may also be combined. For the switched early/late case the PROM would require 12 address lines and an output word size of 8 bits, thus defining a 32 k PROM. This configuration is illustrated in FIG. 7.

The input signal at L-band for all channels is first down-converted through a single chain of r.f. and i.f. stages to a frequency $F_o+D$. The resulting i.f. signal is fed to two mixers 70a, 70b in quadrature with a local oscillator signal at frequency $F_o$. The I & Q signals so obtained are low pass filtered and applied to A/D converters 71a, 71b. Adaptive threshold techniques are used to combat non-Gaussian jammers. 2-bit digitisation is employed together with sampling of early, late and prompt (e,l,p) correlations to address a programmable memory chip 72. The corresponding early, late or prompt output conditions are separately accumulated and fed to the channel processor 73. Measurements are made by the channel processor of range, and range-rate is obtained by monitoring the code generator states. Numerically controlled oscillator 74 responsive to the channel processing derives the required phase rotation angle and generates a 6-bit word which forms a part of the PROM address, together with the I & Q digitisation and the e,l,p code sampling.

The primary function of the processor, however, is to maintain track of the code and carrier phases.

Estimates of code position error may be made simply by differencing the early and late correlation samples. These are derived by performing $I^2+Q^2$ operations on the early and late outputs. It may be noted that in this digital implementation channel balance will no longer be a problem. The code position error estimates may then be applied to a software loop filter before being used to update the code generator, hence closing the code tracking loop.

Carrier phase estimates may be made by using a Costas I.Q. technique on the prompt correlation samples. The carrier loop will then be closed in a similar manner to the code loop. Carrier frequency estimates may also be made by performing an operation on time sequential I,Q pairs as shown below:

$$\text{Error frequency } \alpha \; \frac{Q_i I_{i-1} - I_i Q_{i-1}}{I_i^2 + Q_i^2}$$

This error function may be used to assist initial carrier phase acquisition and may also be employed to give frequency estimates when severe jamming precludes use of the carrier phase tracking loop.

This configuration allows the addition of more receiver channels simply by the addition of extra code generators, N.C.O's and PROMS. The same A/D module and channel processor may be used for the extra channels. A separate A/D conversion module will, however, be required if L1 and L2 are to be received simultaneously.

For a lower performance receiver channel the adaptive threshold 2 bit A/D converters may be replaced with single bit units. The correlator need only be a switched early/late type and so only requiring a single pair of I and Q outputs.

If simultaneous operation on a number of satellites, or on different signal segments of the same satellite is required, a number of the serial correlation blocks can be used in parallel.

We claim:

1. A receiver for a Navstar satellite navigation system, said receiver comprising:
    elements for amplification and down conversion to zero i.f. frequencies to produce quadrature signals representing a baseband signal phasor;
    analogue-to-digital converters to digitise separately the quadrature signals;
    means for locally generating digital codes;
    means for correlating the digitised quadrature signals separately with the locally generated digital codes;
    code and carrier tracking loops, and channel signal processing means for generating control signals for controlling the code and carrier tracking loops, the outputs of the correlation means being applied to the processing means;
    correction means responsive to the control signals for effecting phase rotation of the baseband signal phasor to effect Doppler tracking in the carrier tracking loop;
    said correlation means including a digital memory loaded with data in the form of "look-up" tables incorporating combinations of signal input conditions;
    means for applying the digitised quadrature signals as partial address signals for the memory; and
    said correlation means including means for generating additional address signals for the memory in response to the control signals;
    whereby phase rotation correction is effected by accessing the memory in accordance with the address signals to produce an output signal for the channel signal processing means.

2. A receiver according to claim 1 characterised in that the Doppler shift determined in the processing means is a numerical value represented as a digital word, the correction means being a numerically controlled oscillator (NCO) to which said digital word is applied, the output of the NCO being said additional address signals for the memory means.

3. A receiver according to claim 2 characterised in that the memory means is implemented as a programmable read-only-memory (PROM).

4. A receiver according to claim 3 characterised in that the receiver includes means for generating further address signals for the memory means to effect correlation of the digitised quadrature signals with the locally generated digital codes when said locally generated codes are "early" or "late" with respect to the time of receipt of the quadrature signals.

5. A receiver for the NAVSTAR satellite navigation system characterised in that the receiver includes a digital data memory means loaded with data in the form of "look-up" tables incorporating combinations of signal input conditions, means for converting the received satellite signals into digitised address signals for the memory means, said digitized address signals being digitized quadrature signal representations of a baseband signal phasor, channel signal processing means to which the outputs of the memory means are applied, and correction means responsive to control signals generated in the processing means to effect phase rotation correction of the baseband signal phasor to effect Doppler tracking in the receiver loop, said correction means generating additional memory address signals for the memory means whereby said phase rotation can be effected.

* * * * *